(12) United States Patent
Tang et al.

(10) Patent No.: US 7,255,953 B2
(45) Date of Patent: Aug. 14, 2007

(54) ELECTRODE PATTERN FOR SOLID STATE IONIC DEVICES

(75) Inventors: Zheng Tang, Calgary (CA); Debabrata Ghosh, Calgary (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 97 days.

(21) Appl. No.: 09/682,411

(22) Filed: Aug. 30, 2001

(65) Prior Publication Data

US 2002/0028371 A1   Mar. 7, 2002

Related U.S. Application Data

(60) Provisional application No. 60/229,322, filed on Sep. 1, 2000.

(51) Int. Cl.
  *H01M 4/86* (2006.01)
  *H01M 4/88* (2006.01)
  *H01M 8/12* (2006.01)

(52) U.S. Cl. ............... 429/40; 429/30; 427/115

(58) Field of Classification Search ............... 429/30, 429/32, 40, 44; 427/115
  See application file for complete search history.

(56) References Cited

U.S. PATENT DOCUMENTS 3,402,230 A   9/1968  White, Jr.
5,516,597 A * 5/1996  Singh et al. .................. 429/30
5,750,279 A * 5/1998  Carolan et al. ............... 429/32
6,361,892 B1 * 3/2002  Ruhl et al. ..................... 429/30
2004/0180252 A1 * 9/2004  Wortman et al. ............. 429/34

FOREIGN PATENT DOCUMENTS

EP   0 834 949       4/1998
EP   1 113 518       7/2001
JP   2-87471         3/1990
JP   02-087472    *  3/1990

OTHER PUBLICATIONS

D. Ghosh, et al; "Performance of Anode Supported Planar SOFC Coils"—Electrochemical Society Proceedings, vol. 99, No. 19, 1999, pp. 822-829, XP00801065.

* cited by examiner

*Primary Examiner*—Jonathan Crepeau
(74) *Attorney, Agent, or Firm*—Bennett Jones LLP

(57) ABSTRACT

A solid oxide fuel cell electrode is stable during thermal cycling and includes a plurality of discrete geometric elements lightly packed on the electrolyte surface. Preferably, the geometric elements are regular hexagons, creating a "Thoneycomb" pattern electrode.

10 Claims, 1 Drawing Sheet

ELECTRODE PATTERN FOR SOLID STATE IONIC DEVICES

BACKGROUND OF THE INVENTION

The present application claims the benefit of U.S. Provisional Application No. 60/229,322 filed Sep. 1, 2000.

The present invention relates to macroscopic patterns applied to electrodes of solid state ionic devices.

Solid oxide fuel cells ("SOFC's") are high temperature electrochemical devices fabricated primarily from ceramic oxides. Typically they contain an oxygen ion conducting solid electrolyte, such as stabilized zirconia. The electrolyte is usually a thin dense film that separates two porous electrodes, an anode and a cathode. An interconnection is usually employed which is stable in both oxidizing and reducing environments, and provides a manifold to conduct fuel and an oxidant, usually air, separately into the cell. The cell operates by electrochemically oxidizing a gaseous fuel, such as hydrogen, to produce electricity and heat. The electrode must be compatible with the chemical, electrical, and mechanical properties such as thermal expansion rates of the solid electrolyte to which it is attached.

The use of cermet electrodes for SOFC's is well known in the art. The cermet electrode is manufactured by applying a mixture of a metallic element, an oxide, or simply yttria stabilized zirconia onto the electrolyte of a cell. Various methods are known to apply the green state cermet electrode on a solid electrolyte. Examples of such prior art methods include dipping, spraying, screen printing, and vapour deposition. In order to maximize the electrochemical active area, an electrode is applied to the entire electrolyte surface. Finally, a sintering process is usually applied to bond the cermet electrode to the electrolyte. The microstructure of a sintered cermet electrode is more amenable to modification and control, allowing the performance of the cell to be optimized.

Despite the advantages of a cermet electrode described in the prior art, the bond between a cermet electrode and the electrolyte is usually a weak one. This arises from the difference in the coefficient of thermal expansion between the cermet electrode and the electrolyte. Also the bonding between a metallic element and an oxide electrolyte relies on weak physical bonding rather than strong chemical bonding. Thus the detachment of a cermet electrode from the electrolyte is a common problem, which occurs both during SOFC manufacturing and testing. This reduces the active area for the electrode reaction, and increases the overpotential lost at the interface. This problem increases in severity as the size of the SOFC increases.

Thermal cycling capability is very important for a number of commercial applications of SOFC's. However, thermal cycling magnifies the stresses between the electrode and the electrolyte because of the difference in thermal expansion coefficients and rates. In order to suppress the problem, one solution is to increase the oxide component to enhance the bonding as well as to match the thermal expansion coefficient to an allowable value. However, this improvement is based upon sacrificing the electrical conductivity of the cermet electrode because of the reduction of the metallic component. According to the percolation theory, when the volume of the electronic conducting phase decreases toward 30 percent, the conductivity will quickly decrease. As a result, the power density of the SOFC will decrease due to the increasing electrical resistance inside the cermet electrode. To a certain extent the problems with the prior art as described herein apply to other types of electrodes in addition to cermet electrodes, such as for example, metal oxides and LSM electrodes, since there is usually a difference in thermal expansion coefficients.

Thus the optimization of the cermet electrode through composition adjustments is limited. Prior art attempts to solve the thermal expansion problems have used skeletal embedded growth of primarily ionically conducting yttria stabilized zirconia. The skeletal growth extends from the electrolyte/electrode interface into a porous metallic layer, with the composite structure comprising the porous cermet electrode. In one example, bonding of the porous nickel anode to the solid oxide electrolyte was accomplished with a modified electrochemical vapour deposition (EVD) process. This process provides well bonded anodes having good mechanical strength and thermal expansion characteristics, however overall cell performance is lower than with other bonding methods. The EVD process, while producing acceptable quality electrodes, is labour intensive and very expensive. A simpler and less expensive method of producing electrodes which mitigate the difficulties of the prior art is needed, without sacrificing electrode performance.

SUMMARY OF THE INVENTION

The present invention relates to electrodes which are applied to the electrolyte in a pattern. The pattern physically breaks a large monolithic electrode into a plurality of small discrete elements. Thus the stress caused by the thermal expansion mismatch will be limited to a much smaller area, with a corresponding reduction in strain at the interface of the small elements, thereby reducing delamination and increasing thermal cycling capability.

In accordance with a broad aspect of the invention, the electrode is divided into many small discrete areas or elements, rather than a monolithic electrode. The gaps between the elements are preferably kept as narrow or small as possible to minimize the loss of active area. In a preferred embodiment, the elements are hexagonal in shape, creating a honeycomb array of electrode elements.

In accordance with another broad aspect of the invention, the patterned layer is sintered after being deposited upon the substrate.

DETAILED DESCRIPTION

Figure 1:
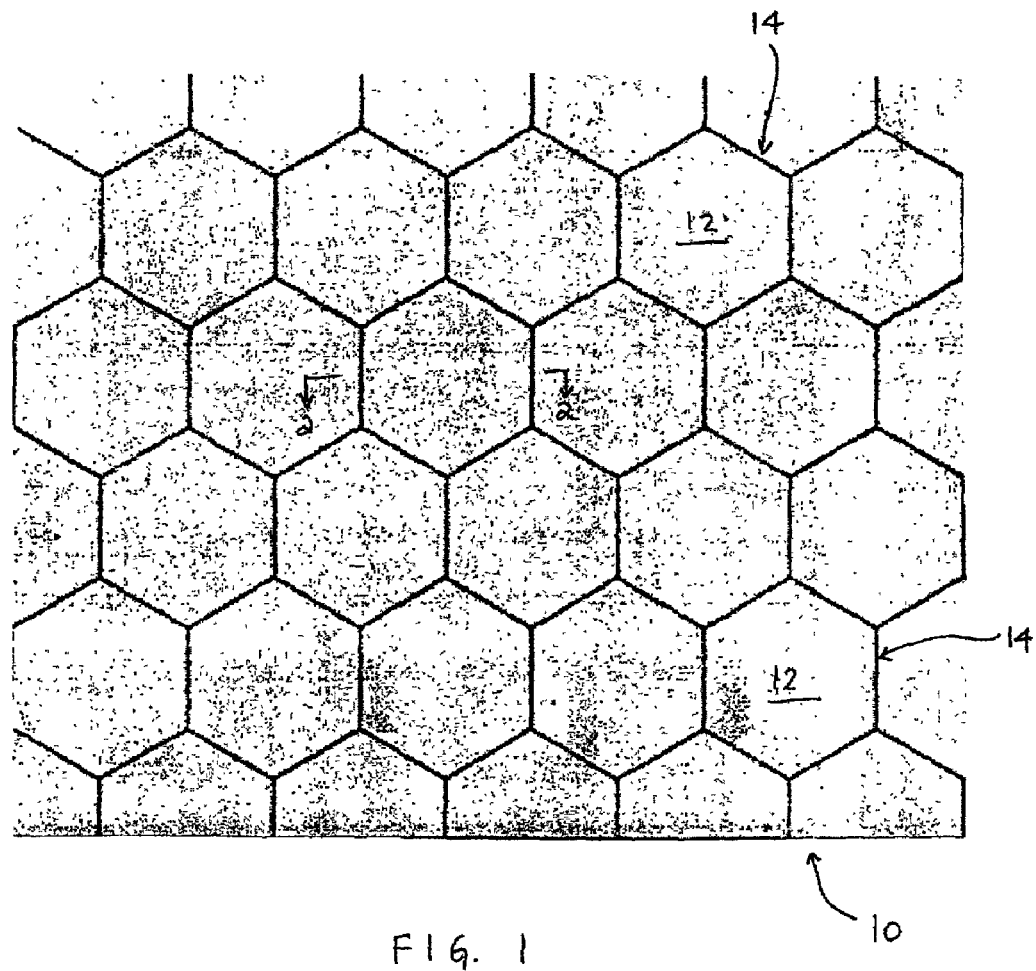
FIG. 1 shows a schematic of the electrode pattern of one embodiment of a solid oxide fuel cell of the present invention.
Figure 2:
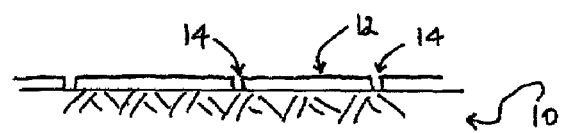
FIG. 2 is a cross-sectional view of a electrolyte and electrode layers of fuel cell of FIG. 1.

In FIG. 1, a pattern as applied to an electrode is illustrated. The present invention is applicable to cathodes or anodes. The surface of the electrode (10) is divided into uniformly sized elements (12), which are separated by gaps (14). The elements (12) are hexagonal and arranged into closely packed "honeycomb" array. A hexagonal shape is preferred as this permits the maximum number of elements to be packed into a two dimensional plane, while allowing the internal corner angles of each element to be relatively large. In the specific example of a hexagonal element, the interior angle is 120 degrees. A large corner angle is important to reduce the stress concentrations at the corners of the elements, and thus reduce the probability of cracking and peeling. Thus, a hexagon with a corner angle of 120 degrees will be more stable than a square having a corner angle of 90 degrees or a triangle having a corner angle of 60 degrees. However, the present invention is not intended to exclude variations comprising pentagonal, quadrilateral, triangular or other geometric shapes.

The polygonal shapes of the present invention may or may not be regular polygons but should preferably be symmetrical. A regular polygon is one where all of the internal angles are the same and the length of each side of the polygon are equal. As will be apparent, a tightly packed array of elements may be achieved with symmetrical but not regular polygons.

The hexagonal pattern is also more forgiving of slight mismatches between the elements than other geometric patterns, such as squares, caused by movement during sintering and thermal cycling of the cell, while maintaining the maximum active area of electrode. The hexagonal pattern allows for the area lost to the inter element gaps (14) to be minimized in the case of element mismatch. The hexagonal pattern also allows the gaps (14) between the elements (12) to be kept to a minimum. It is preferred that the shapes be interlocking or complementary so that the gaps (14) are minimized. Preferably, the surface area lost to the gaps is less than about 5%, more preferably less than about 2%. In the embodiment illustrated in FIG. 1, less that 1% of the electrode surface area is taken by the gaps (14) between the elements (12). Although hexagons are the preferred shape of the current embodiment, any shape may be used, such as pentagons, squares and triangles, although not all shapes may have the same advantages of hexagons as described herein.

In the example shown, the planar electrode is about 90 mm square while each hexagonal element is about 8.6 mm wide, resulting in a 10×10 array of hexagonal elements. The gaps (14) are less than about 0.15 mm wide. The border of the electrode may be a contiguous border element or may comprise a plurality of whole or partial hexagonal elements.

In one embodiment, the array of discrete elements may be screen printed onto the electrolyte. A screen with a pattern such as the pattern shown in FIG. 1 may be made using conventional screen fabrication techniques as used in the thick film screen printing industry. If the desired electrode is a cathode, a cermet cathode paste may be screen printed on the electrolyte through the patterned screen. After drying, it is further sintered at about 1300° C. A contact paste of lanthanum cobaltate ($LaCoO_3$) is then screen printed on top of the cathode before loading the cell into a fuel cell stack. This layer is interposed between the electrodes and an interconnect to improve electrical conductivity and mechanical bonding characteristics between them. This layer has the additional effect of physically separating the layers and preventing interdiffusion among chemically incompatible components during testing. The contact paste layer is not essential but is preferred. If the desired electrode is an anode, the contact paste layer is not necessary.

As will be apparent to those skilled in the art, various modifications, adaptations and variations of the foregoing specific disclosure can be made without departing from the scope of the invention claimed herein.

The invention claimed is:

1. A solid oxide fuel cell comprising an electrode layer applied to an electrolyte layer wherein the electrode layer is not contiguous but rather is formed from a plurality of substantially discrete hexagonal elements separated by substantially linear and uniform gaps, such that adjacent hexagons have parallel edges, wherein the gaps take up less than about 2% of the surface area of the electrode.

2. A method of applying an electrode layer to an electrolyte layer in a SOFC comprising the steps of:
    (a) providing a screen defining a pattern comprising a plurality of discrete elements;
    (b) screen printing an electrode paste through the screen and onto the electrolyte such that the resulting electrode layer comprises a plurality of discrete elements that have a regular hexagonal shape and which are separated by substantially linear, uniform and narrow gaps, wherein the gaps take up less than about 5% of the surface area of the electrode, such that adjacent polygonal discrete elements have parallel edges and form a pattern comprising a honeycomb array of elements; and
    (c) sintering the electrode layer.

3. The method of claim 2 further comprising the step of adding a contact paste layer over the electrode layer.

4. A solid oxide fuel cell comprising an electrode layer applied to an electrolyte layer wherein the electrode layer is discontinuous and comprises a plurality of substantially discrete polygonal elements that are hexagonal in shape separated by substantially uniform gaps, wherein the gaps take up less than about 5% of the surface area of the electrode, and wherein adjacent polygonal elements have parallel edges.

5. The solid oxide fuel cell of claim 4 wherein said hexagons are regular hexagons.

6. The solid oxide fuel cell of claim 4 further comprising a contact paste layer applied to the electrode layer.

7. The solid oxide fuel cell of claim 6 wherein the contact paste layer is a conducting ceramics including lanthanum cobaltate.

8. The solid oxide fuel cell of claim 7 wherein the contact paste layer is not sintered prior to use.

9. The solid oxide fuel cell of claim 4 wherein the gaps take up less then 2% of the surface area of the electrode.

10. The solid oxide fuel cell of claim 9 wherein the gaps take up less than about 1% of the surface area of the electrode.

* * * * *